United States Patent [19]

Heidari

[11] Patent Number: 5,550,893
[45] Date of Patent: Aug. 27, 1996

[54] SPEECH COMPENSATION IN DUAL-MODE TELEPHONE

[75] Inventor: Alireza R. Heidari, Encinitias, Calif.

[73] Assignee: Nokia Mobile Phones Limited, Salo, Finland

[21] Appl. No.: 381,314

[22] Filed: Jan. 31, 1995

[51] Int. Cl.$^6$ ................................................. H04Q 7/32
[52] U.S. Cl. .......................... 379/59; 455/33.1; 375/216
[58] Field of Search ................................. 375/216, 240; 379/58, 59; 455/33.1

[56] References Cited

U.S. PATENT DOCUMENTS

| | | | |
|---|---|---|---|
| 5,251,232 | 10/1993 | Nonami | 375/216 |
| 5,404,579 | 4/1995 | Obayashi et al. | 379/59 |
| 5,428,664 | 6/1995 | Kobayashi | 379/58 |

*Primary Examiner*—Dwayne D. Bost
*Attorney, Agent, or Firm*—Perman & Green

[57] ABSTRACT

A dual-mode telephone has transmit and receive channels suitable for cellular telephony, and is operative in analog and digital modes of communication. Each of the channels has parallel branches of circuitry wherein the circuitry of one branch accommodates voice signals in accordance with an analog protocol and the second branch accommodates voice signals processed by digital compression and expansion circuitry. The digital compression circuitry, which is employed for outgoing voice signals, and the digital expansion circuitry, which is employed for incoming voice signals, constitute a vocoder operative under control of a microcontroller unit. Operation of the vocoder during a digital transmission mode introduces a digitally processed quality to received voice signals, this characteristic being distinguishable from the voice quality of pulse-code modulation employed in the analog communication mode. In order to introduce uniformity of voice quality during both analog and digital modes of communication, the telephone includes circuitry for inserting the vocoder circuitry into the analog branch of the receive channel as a speech compensator with the compression and expansion circuitry operated in a back-to-back arrangement. The input and output signal formats of the speech compensator are identical, but the resulting output signal of the compensator has a digitally processed voice quality. Thereby, the digitally processed voice quality is present in both analog and digital modes of communication so as to eliminate a disturbance in change of voice quality during a hand-off between the two communication modes.

4 Claims, 2 Drawing Sheets

SPEECH COMPENSATION IN DUAL-MODE TELEPHONE

BACKGROUND OF THE INVENTION

This invention relates to speech communication by a cellular telephone operable in both a digital mode and in an analog mode of communication and, more particularly, to the further processing of a voice signal received during the analog mode of voice communication to provide to the received voice signal a digitally processed voice quality. This ensures a common perceived voice quality in both analog and digital modes of operation.

Cellular telephones may be constructed with a dual-mode operational capability wherein, in one mode, voice signals are communicated via an analog signal protocol and, in the second mode, the voice signals are communicated via digital signal compression. Some base stations operate in an analog mode while other base stations are able to operate in the digital mode. The dual-mode telephone is able to take advantage of the digital signal protocol when offered by a base station, while falling back to the analog signal protocol for base stations offering only the analog mode of communication. For vehicles traveling from the region of one base station to the region of a second base station, there is a hand-off procedure wherein the cellular telephone automatically tunes to a new assigned communications channel and, in addition, may undergo a switching between the digital and the analog modes of communication.

From the point of view of a person operating the cellular telephone, such a hand-off procedure including switching between digital and analog modes is accomplished automatically and should, therefore, be of no concern to the person operating the cellular telephone. However, there is a distinct identifiable quality to digitally processed voice signals which is different from a distinct identifiable quality to analog processed voice signals. The perceptual differences are much more pronounced when background noise, such as car noise or babble noise, is present. As a result, a person operating the cellular telephone becomes aware of a hand-off in which the telephone switches between digital and analog modes of communication.

A problem arises in that many telephone customers react adversely to the change in perceived quality of the voice communication during a switching between the digital and the analog modes of communication. It has been observed that some telephone customers actually return their dual-mode telephones to the telephone supplier because the customers believe that such change in voice quality is an indication of faulty telephone operation. It appears that people, in the use of telephones, expect a uniform quality and type of sound to which they may have grown accustomed.

SUMMARY OF THE INVENTION

The aforementioned problem is overcome and other advantages are provided by a cellular telephone which operates in accordance with the invention by providing a uniform speech quality and perceived sound independently of whether the cellular phone is being operated in a digital or an analog mode of communication. Furthermore, in accordance with a feature of the invention, the uniform sound and quality of the voice is obtained by use of electrical circuitry already present within a digital cellular telephone.

Typically, in the construction of a cellular telephone, the voice signal is received by a microphone, and is applied to pulse code modulation (PCM) circuitry. The PCM circuitry includes a codec which obtains analog samples of the voice signals, and converts the samples from analog format to digital format. For transmission via the digital communication mode, the telephone is provided with a vocoder which includes both digital compression and digital expansion circuitry. The compression circuitry is employed for transmission of an outgoing signal and provides a compressed packet of the voice signal having a reduced number of samples. The expansion circuitry is employed during reception of an incoming signal and operates to restore the voice signal to the same form which the voice signal had prior to the compression. For transmission via the digital mode of communication, the signal outputted by the codec is applied via the compression circuitry to obtain a digitally formatted compressed signal. The compressed signal is then encoded in accordance with a digital mode of communication, for example, time division multiple access (TDMA) or code division multiple access (TDMA), and then is modulated onto a carrier for transmission to the base station. The signal received from the base station is demodulated, decoded, and decompressed to regain the analog sampled data format of the voice signal. This places the received signal in the PCM format ready to be applied to the speaker by which a person hears the received voice.

In the case of communication via the analog communication mode, the foregoing compression/expansion circuitry and TDMA/CDMA modulation and demodulation circuitry is bypassed by analog protocol transmission and reception circuitry. The received signal is in the PCM format ready to be applied to the speaker by which the person hears the received voice signal. It is noted also that the operation of a radiotelephone entails also the use of numerous control signals operative along a control channel of the radiotelephone for accomplishing tasks such as assignment of communication channels to a base station and implementation of hand-off procedures. A description of such control signals is not necessary for an understanding of this invention and, accordingly, no description of the control signals and of there specialized electric circuits is provided herein.

In the digital mode of communication, passage of the signal through the digital compression and expansion circuitry imparts a digitally processed quality to the voice signal. This digitally processed voice quality is absent during the bypassing of the digital compression/expansion circuitry in the analog mode of communication. To provide a uniform voice quality in both the analog and the digital modes of communication, the invention provides for the presence of the digitally processed voice quality in both the analog and the digital modes of communication. To provide the digitally processed voice quality in the analog mode of communication, the received demodulated signal is rerouted through the digital compression/expansion circuitry wherein the compression circuitry and the expansion circuitry are connected in a back-to-back arrangement. This provides the same processed speech quality in the analog communication mode as is present in the digital communication mode. As a result, a person utilizing the cellular telephone does not perceive any change in the sound of the voice heard over the telephone, even when the telephone undergoes a hand-off procedure between base stations employing digital and analog modes of communication.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures.

DETAILED DESCRIPTION

Figure 1:
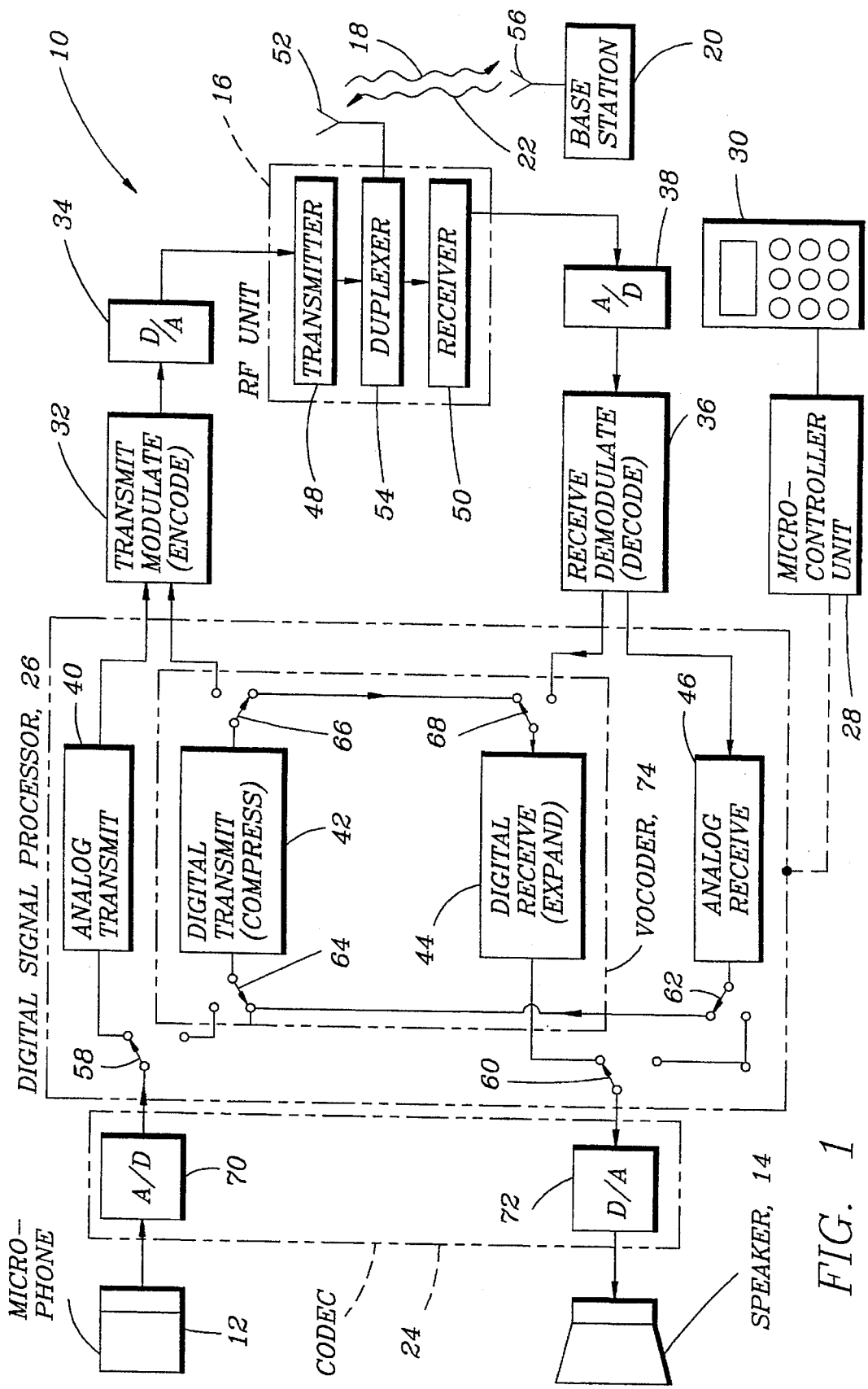
FIG. 1 is a block diagram showing the audio portion of a mobile telephone incorporating the invention, a set of switches of a digital signal processor of the telephone being shown in positions for routing a voice signal in the analog communication mode including a routing of a received voice signal through a vocoder to impart a digitally processed quality to the voice signal outputted by a speaker of the telephone in accordance with the invention.

With reference to FIG. 1, a mobile telephone 10 is provided with a microphone 12 by which the telephone 10 picks up the voice of a person utilizing the telephone 10, and a speaker 14 by which a voice signal received by the telephone 10 is presented to the person utilizing the telephone 10. The voice signal, after being suitably encoded and modulated onto a carrier, as will be described hereinafter, is transmitted by an RF (radio frequency) unit 16 of the telephone 10 by a down-link transmission path 18 to a base station 20. In corresponding fashion, a voice signal to be received by the telephone 10 is transmitted from the base station 20 along an up-link transmission path 22 to the RF unit 16. The telephone 10 is part of a telephone system including a multitude of telephones (not shown) which communicate with each other via the base station 20 in designated frequency bands, and by analog or digital modes of communication which are well known. By way of example, well known modes of digital communication include the aforementioned TDMA and CDMA. The telephone 10 is constructed as a dual-mode telephone capable of communicating alternatively in either an analog or a digital mode of communication.

The telephone 10 further comprises a codec 24, a digital signal processor (DSP) 26 under control of a microcontroller unit (MCU) 28, a control panel 30 also controlled by the MCU 28, a transmit modulator 32 coupled by a digital-to-analog converter 34 to the RF unit 16, and a receive demodulator 36 coupled via an analog-to-digital converter 38 to the RF unit 16. The control panel 30 may be constructed in a well-known form having pushbuttons and a display utilized by a person operating the telephone 10 to place a call. The DSP 26 includes an analog transmitter 40, a digital transmitter 42, a digital receiver 44, and an analog receiver 46. The RF unit 16 comprises a transmitter 48, a receiver 50, an antenna 52, and a duplexer 54 which interconnects the transmitter 48 and the receiver 50 with the antenna 52. The base station 20 includes an antenna 56 for the electromagnetic communication via the paths 18 and 22 with the antenna 52 of the RF unit 16. Also included in the DSP 26 is a pair of switches 58 and 60 to enable selection of the analog or digital mode of communication. Four additional switches 62, 64, 66, and 68 are provided in the DSP 26 and are operative in conjunction with the switches 58 and 60 for reconfiguring the interconnection of the components of the DSP 26 to provide a digitally processed voice quality in the analog mode of communication, in accordance with the invention as will be described hereinafter.

The analog transmitter 40 and the digital transmitter 42 represent parallel branches of the transmit channel, and the analog receiver 46 and the digital receiver 44 represent parallel branches of the receive channel of the telephone 10. Either the analog branches or the digital branches are employed depending, respectively, on whether an analog or digital mode of communication is to be employed. Furthermore, in accordance with a feature of the invention, the digital transmitter 42 and the digital receiver 44 are to be connected in a back-to-back configuration to form a speech compensator which is to be inserted within the analog branch of the receive channel, during the analog mode of communication, to provide digitally processed speech quality in both analog and digital modes of communication. Also, the invention provides that the introduction of the speech compensator can be accomplished by a switching of existing circuitry of the DSP 26 without need for additional circuitry.

In operation, during both analog and digital modes of communication, the codec 24 provides for a sampling of the audio signal received by the microphone 12, the sampling being accomplished at a rate of typically 8,000 Hertz (Hz) by use of pulse code modulation (PCM) wherein the amplitude of each signal sample is held until the occurrence of the next sample. The amplitudes of the successive samples are converted from analog to digital format by an analog-to-digital converter 70 of the codec 24. The output signal of the converter 70 is a digital bit stream representing the samples of the speech waveform. By way of example, for a linear codec having 13 bit resolution, the output of the converter 70 provides 13 bits per sample wherein the samples are outputted at a rate of 8,000 samples per second. This gives a bit rate of 104 Kbits per second. In the event that the codec 24 operates in a nonlinear, such as a Mu-law, fashion having an 8 bit resolution per sample, and the samples are outputted at a rate of 8,000 samples per second, the output of the converter 70 is at 64 Kbits per second. Also included in the codec 24 is a digital-to-analog converter 72 which provides a conversion process which is reverse to that of the converter 70. The converter 72 converts a digital bit stream outputted via the switch 60 of the DSP 26 to a succession of analog signal samples which drive the speaker 14. In the analog communication mode, wherein there is no digital signal compression, the speech quality outputted by the speaker 14 may be referred to as PCM speech quality.

In the analog communication mode, the digital bit stream outputted by the converter 70 is coupled via the switch 58 to the analog transmitter 40 wherein the speech samples are interpolated to increase the sampling rate from the foregoing rate of 8 Ksamples per second to a rate of 160 Ksamples per second. This preserves the 13 bit resolution of a sample. The signal outputted by the analog transmitter 40 is applied to the transmit modulator 32 which acts, in the analog communication mode, to provide for a frequency modulation of the output signal of the analog transmitter 40. This modulation is accomplished digitally, and a digital output signal of the modulator 32 is then converted by the converter 34 to analog format and applied to an input terminal of the transmitter 48. The transmitter 48 includes circuitry (not shown) for modulating the output signal of the converter 34 on to the down-link RF carrier for transmission to the base station 20.

The voice signal transmitted from a distant telephone via the base station 20 is communicated by an up-link carrier frequency and via the duplexer 54 to the receiver 50. The duplexer 54 serves to separate the transmitted carrier signal of the transmitter 48 from the received carrier signal at the receiver 50. The receiver 50 translates the received voice signal from the carrier frequency to an intermediate frequency (IF). The IF signal is converted from analog to digital format by the converter 38 and applied to the receiver demodulator 36. The receive demodulator 36 demodulates the FM signal, and outputs the demodulated signal to the analog receiver 46 of the DSP 26. In the analog receiver 46, the speech sampling rate is reduced from 40 Ksamples per second, via a down-sampling procedure, to the 8 Ksample per second rate, and is then sent via the switch 62 and the switch 60 to the converter 72 of the codec 24. The converter 72 converts the digitally formatted signal to the analog format, as has been noted above, for driving the speaker 14.

In the digital communication mode, use is made of the digital transmitter 42 and the digital receiver 44 which constitute a vocoder 74, the vocoder 74 being a part of the DSP 26 and operating under control of the microcontrol unit 28. The vocoder 74 operates in a well-known fashion to introduce a compression to the speech for voice signals outputted by the RF unit 16, and to decompress, or expand, voice signals received by the RF unit 16. The vocoder 74 may be operative to provide for signal compression and decompression in accordance with the well-known CDMA or TDMA protocols. A speech compression protocol may be used for cellular telephony in big cities having a relatively large amount of telephone traffic, as compared to rural areas. The speech compression enables many more telephone conversations to be conducted concurrently among a multitude of telephones than is possible with the analog mode of communication. The speech compression employs the digital communication mode. Operation of the switch 58 selects which branch of the transmit channel is to handle the outgoing voice signal of the microphone 12, and operation of the switch 60 selects the branch of the reception channel which is to handle the received signal for driving the speaker 14.

By way of example, in the case of a vehicle transporting the telephone 10 from a large city to a rural area, the switches 58 and 60 would be initially in a position for conduction of the voice signal via the digital transmitter 42 and the digital receiver 44 in the digital communication mode. Thereafter, upon passage of the vehicle from the city into the rural area, the switch 58 would be operated to switch the outgoing voice signal via the analog transmitter 40, thereby to bypass the digital transmitter 42. Also, if desired, the switches 60 and 62 may be operated to direct the received signal via the analog branch of the transmit channel, thereby to bypass the digital receiver 44. However, such operation of the switches 60 and 62 would enable the telephone 10 to receive an incoming voice signal in the rural area via the analog communication mode without benefit of the inventive feature of maintaining uniform voice quality during a hand-off procedure between analog and digital modes of communication. The necessary switching to provide the benefit of the invention will be described hereinafter.

In the operation of the telephone 10 in the digital communication mode, the signal from the converter 70 is coupled via the switch 58 and the switch 64 to the digital transmitter 42. The digital transmitter 42 compresses the samples of the voice signal from a sampling rate of 104 Kbits per second, or possibly from a rate of 64 Kbits per second depending on the type of equipment used, to a maximum rate of 8.55 Kbits per second. The compressed packets of the speech are then forwarded by the switch 66 to encoding circuitry within the transmit modulator 32 which attaches a specific code word to the packet in accordance with central timing provided by the base station 20. Such encoding is well-known, and need not be described in detail for an understanding of the practice of the invention. The coded word is then modulated, as by means of phase-shift keying for example, upon an IF carrier via the modulator 32. Thereupon, the output signal of the transmit modulator 32 is converted from digital format to analog format by the converter 34, translated to an RF carrier at the transmitter 48, and outputted via the duplexer 54 and the antenna 52 to the base station 20.

Reception of the voice signal in the digital communication mode proceeds in corresponding fashion wherein the signal received from the base station 20 via the antenna 52, and the duplexer 54 is translated at the receiver 50 from the RF carrier to an IF carrier. Thereupon, the received signal is converted from digital to analog format by the converter 38 and applied to the receive demodulator 36. The receive demodulator 36 is operative to demodulate the phase modulation and to recover the compressed packet by a decoding of the code word. Thereupon, the compressed packet is forwarded via the switch 68 to the digital receiver 44 which decompresses, or expands, the packet from the sampling rate of 8.55 Kbits per second to obtain the original sampling rate of 104 Kbits per second (or 64 Kbits per second). The signal format at the output of the digital receiver 44 is the same format as is present at the input terminal of the digital transmitter 42. The output signal of the digital receiver 44 is applied via the switch 60 to the converter 72 to regain the analog signal format for driving the speaker 14. Control of the switches 58, 60, 62, 64, 66, and 68 to provide interconnections of the components of the DSP 26 is accomplished by commands from the microcontroller unit 28.

In the operation of the telephone 10, as so far described, provision is made for communicating via the analog communication mode or via the digital communication mode. In the analog communication mode, the quality of the voice perceived at the speaker 14 is the so-called PCM quality wherein characteristics of the voice are affected by the manner of sampling of the voice signal. However, in the use of the digital communication mode, the PCM samples provided by the codec 24 are further modified by operation of the compression and expansion circuitry of the vocoder 74 resulting in a noticeably different sound quality to voice signals outputted by the speaker 14. The result of a hand-off procedure between the analog and the digital communication modes, as noted hereinabove, is a perceived change in the voice quality which may be disturbing to a person utilizing the telephone 10.

To facilitate explanation of the switch positions for the various modes of operation of the telephone 10, in FIG. 1, the switch positions are shown for the analog communication mode and wherein the received signal of the analog protocol is rerouted through the vocoder 74 prior to application to the codec 24 and the speaker 14. Thus, the switch 58 is shown connected between the output terminal of the converter 70 and the input terminal of the analog transmitter 40. The switches 60, 62, 64, 66 and 68 are shown in their respective positions for routing a received signal from the output terminal of the analog receiver 46 to the input terminal of the digital transmitter 42, and from the output terminal of the digital transmitter 42 to the input terminal of the digital receiver 44, and from the output terminal of the digital receiver 44 to the input terminal of the converter 72.

Figure 2:
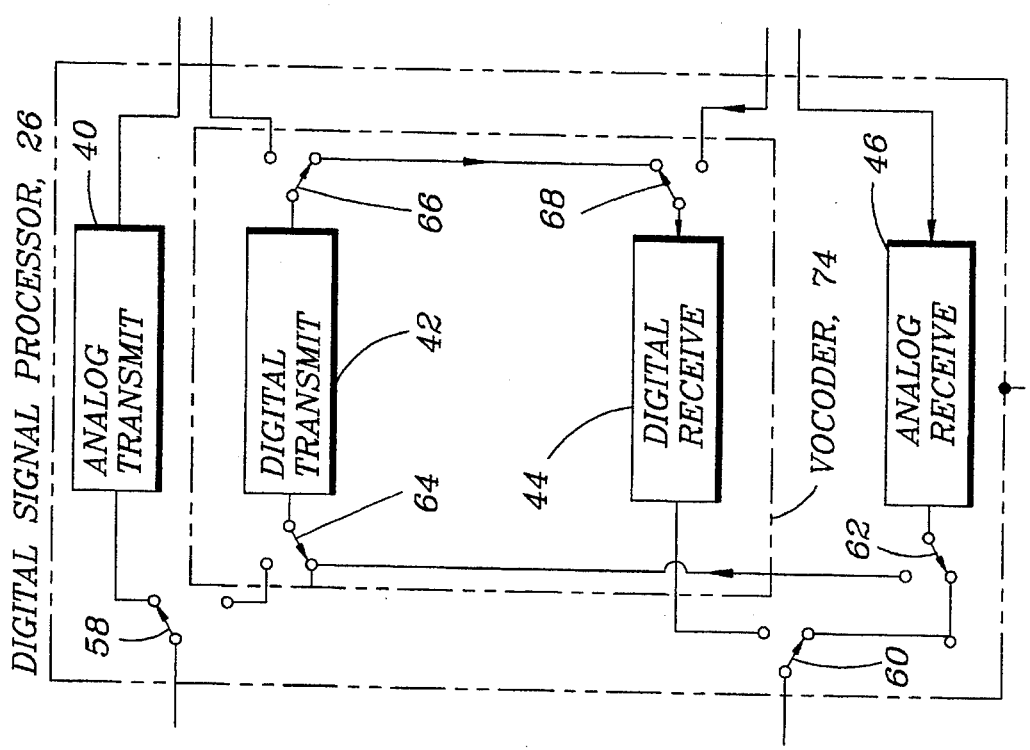
FIG. 2 is a block diagram of the digital signal processor of FIG. 1 wherein the switch positions are set for the analog communication mode without the rerouting of the received signal through the vocoder.

In FIG. 2, the switch positions are shown for conducting the voice signals in the analog communication mode without use of the uniform signal quality feature of the invention. Thus, the switch 58 conducts the voice signal to the input terminal of the analog transmitter 40 and the switches 60 and 62 are positioned for conducting the output signal of the analog receiver 46 directly to the codec 24 (shown in FIG. 1) without the routing of the received analog protocol signal via the vocoder 74.

Figure 3:
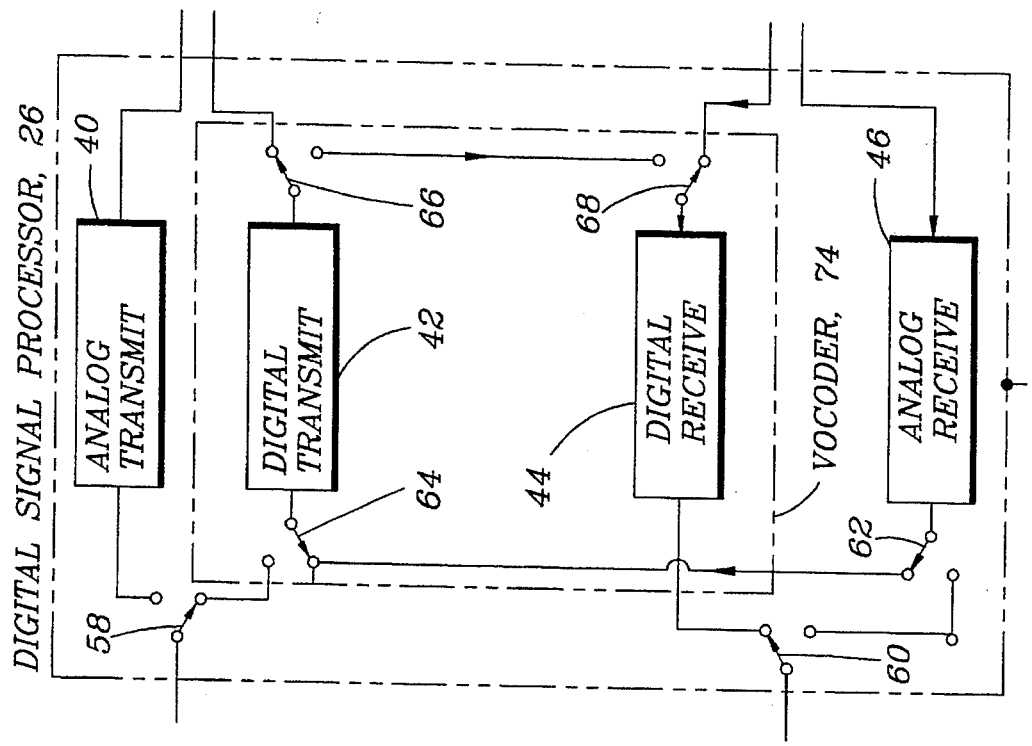
FIG. 3 is a block diagram of the digital signal processor of FIG. 1 with the switch positions shown for a digital mode of communication.

FIG. 3 shows the positions of the switches for conducting the voice signal in the digital mode of communication. Thus, the switches 58 and 64 are shown positioned for conducting the voice signal from the codec 24 (shown in FIG. 1) to the input terminal of the digital transmitter 42. The switch 66 is shown for conducting the compressed signal from the output terminal of the digital transmitter 42 to the transmit modulator 32 (shown in FIG. 1). The switch 68 is shown positioned for coupling the received signal from the receive demodulator 36 (shown in FIG. 10) to the input terminal of the digital receiver 44. The switch 60 is shown positioned for coupling the decompressed signal from the output terminal of the digital receiver 44 to the codec 24 (shown in FIG. 1). Thereby, upon comparison of the switch positions of the DSP 26, as shown in FIGS. 1, 2, and 3, it is seen that the various operating modes of the digital signal processor 26 can be accomplished by operation of the switches 58, 60, 62, 64, 66, and 68 without need for further circuitry. Indeed, the same circuitry of the vocoder 74 which is employed for the digital communication mode of FIG. 3 is employed for the signal compensation in the analog communication mode in FIG. 1 to provide for the uniform digitally processed voice quality in both the digital and the analog communication modes.

In accordance with the invention, the above-noted disturbance of perceived sound quality experienced during a hand-off procedure is eliminated by providing for a uniform quality to a voice signal outputted by the speaker 14 independently of whether the telephone 10 is being operated in the analog communication mode or the digital communication mode. The invention is accomplished in the following manner. With respect to utilization of the vocoder 74 in the digital mode of communication, the Operation of the telephone 10 is the same as that which has been described hereinabove. However, with respect to the operation of the telephone 10 in the analog communication mode, the operation proceeds by the following modified procedure. The voice signal from the microphone 12 is applied via the switch 58 to the analog transmitter 40 for transmission via the transmit modulator 32 and the RF transmitter 48 to the base station 20. The voice signal received from the base station 20 is coupled via the receiver 50 and the receive demodulator 36 to the analog receiver 46 of the DSP 26. Then the voice signal is routed by the switch 62 to the vocoder 74 prior to application of the received signal to the codec 24.

Thus, in accordance with the invention, the received signal outputted by the analog receiver 46 is applied by the switch 62 and the switch 64 to the input terminal of the digital transmitter 42. The digital transmitter 42 is operated in its usual fashion to provide for a compression of the voice signal. Thereupon, the compressed signal outputted by the digital transmitter 42 is applied via the switch 66 and the switch 68 to the input terminal of the digital receiver 44. The digital receiver 44 operates in its usual fashion to expand the voice signal and thereby recover the voice signal in the same format as was present at the output terminal of the analog receiver 46. The recovered voice signal outputted by the digital receiver 44 is applied by the switch 60 to the converter 72 for driving the speaker 14.

The introduction of the digital transmitter 42 and the digital receiver 44 in the back-to-back arrangement has essentially no effect on the format and intelligibility of the received signal, but does leave an imprint in the voice quality such that the received signal now has a digitally processed voice quality. Therefore, as a result of the interposition of the vocoder 74 into the analog branch of the receive channel of the telephone 10, a person utilizing the telephone 10 perceives the same digital processed voice quality as would be perceived upon operation of the telephone 10 in the digital communication mode. This accomplishes the goal of the invention of maintaining a uniform quality of voice signal in both the digital and the analog communication modes so that there is no disturbing change of voice quality during a hand-off procedure. Furthermore, the invention is practiced without requiring any change in the equipment or operation of the base station.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A dual mode telephone operative in an analog mode of communication and in a digital mode of communication, the telephone having a transmit channel and a receive channel suitable for cellular telephony, the telephone comprising:

digital compression circuitry and analog protocol transmission circuitry within said transmit channel;

digital expansion circuitry and analog protocol reception circuitry within said receive channel;

selector switching means operative in said transmit channel for bypassing said digital compression circuitry by said analog protocol transmission circuitry and being operative in said receive channel for bypassing said digital expansion circuitry by said analog protocol reception circuitry for operation of the telephone in the analog communication mode, said telephone operating in the digital communication mode upon activation of said switching means to terminate said bypassing; and means, operative during the analog communication mode, for connecting an output terminal of the digital compression circuitry to an input terminal of the digital expansion circuitry to form a speech compensator, and means for inserting said speech compensator in said receive channel during said analog communication mode for providing a digitally processed voice quality to voice signals communicated via said telephone in both said digital and said analog modes of communication.

2. A radiotelephone comprising:

a radio frequency (RF) unit enabling transmission of a voice signal to a base station and reception of a voice signal from the base station;

a voice input means and a transmit channel interconnecting the voice input means to the RF unit;

a voice output means and a receive channel interconnecting the voice output means to the RF unit;

wherein a portion of the transmit channel is bifurcated into an analog protocol signal branch and a digital protocol signal branch;

a portion of said receive channel is bifurcated into an analog protocol signal branch and a digital protocol signal branch;

said radiotelephone further comprises switching means operative to direct voice signals alternately into either the analog protocol branches of said transmit and said receive channels to effect an analog mode of communication or into the digital protocol branches of said transmit and said receive channels to effect a digital mode of communication;

said digital protocol branch of said transmit channel comprises a voice signal compressor and said digital protocol branch of said receive channel comprises a voice signal expander; and said radiotelephone further comprises means, operative during the analog communication mode, for connecting an output terminal of the compressor to an input terminal of the expander to form a speech compensator, and means for inserting said speech compensator in said receive channel during said analog communication mode for providing a digitally processed voice quality to voice signals communicated via said telephone in both said digital and said analog modes of communication.

3. A method of operating a dual-mode telephone in an analog mode of communication and in a digital mode of communication, the telephone having a transmit channel and a receive channel suitable for cellular telephony, the telephone further comprising analog protocol transmission circuitry within said transmit channel and analog protocol reception circuitry within said receive channel and a vocoder switchably connectable within said transmit channel and within said receive channel;

the method comprising steps of:

in said digital communication mode, switching a transmitted voice signal path away from said analog protocol transmission circuitry and into said vocoder, and switching a received voice signal path away from said analog protocol reception circuitry and into said vocoder; and during said analog communication mode, bypassing said vocoder by said analog protocol transmission circuitry and by said analog protocol reception circuitry, and inserting said vocoder into said receive channel between said analog protocol reception circuitry and an output port of said receive channel.

4. A method of operating a radiotelephone in an analog mode of communication and in a digital mode of communication, the radiotelephone having a transmit channel and a receive channel suitable for cellular telephony, wherein a portion of the transmit channel is bifurcated into an analog protocol signal branch and a digital protocol signal branch, wherein a portion of said receive channel is bifurcated into an analog protocol signal branch and a digital protocol signal branch, wherein the radiotelephone further comprises analog protocol transmission circuitry and a digital voice signal compressor disposed respectively within the analog and the digital protocol branches of said transmit channel, and wherein the radiotelephone further comprises analog protocol reception circuitry and a digital voice signal expander disposed respectively within the analog and the digital protocol branches of said receive channel;

the method comprising steps of:

switching voice signals alternately into either the analog protocol branches of said transmit and said receive channels to effect an analog mode of communication or into the digital protocol branches of said transmit and said receive channels to effect a digital mode of communication;

during the analog communication mode, connecting an output terminal of the compressor to an input terminal of the expander to form a speech compensator; and inserting said speech compensator in said receive channel during said analog communication mode for providing a digitally processed voice quality to voice signals communicated via said radiotelephone in both said digital and said analog modes of communication.

\* \* \* \* \*